United States Patent
Visser et al.

(10) Patent No.: US 8,443,547 B2
(45) Date of Patent: May 21, 2013

(54) TRAY FOR PLANTS

(75) Inventors: Anthony Visser, 's-Gravendeel (NL); Cornelis Frans Taco Visser, 's-Gravendeel (NL)

(73) Assignee: Visser's-Gravendeel Holding B.V., 's-Gravendeel (*) Notice: Subject to any disclaimer, the term of this patent is extended or adjusted under 35 U.S.C. 154(b) by 147 days.

(21) Appl. No.: 12/691,679

(22) Filed: Jan. 21, 2010

(65) Prior Publication Data

US 2010/0180500 A1 Jul. 22, 2010

(30) Foreign Application Priority Data

Jan. 21, 2009 (NL) .................................... 1036440

(51) Int. Cl.
*A01G 9/02* (2006.01)

(52) U.S. Cl.
USPC ............................................. 47/66.5; 47/87

(58) Field of Classification Search
USPC .............. 47/87, 66.1, 66.2, 66.5, 79, 73, 66.7
See application file for complete search history.

(56) References Cited

U.S. PATENT DOCUMENTS

| 3,142,133 | A | * | 7/1964 | Brooks | 47/73 |
| 3,751,852 | A | * | 8/1973 | Schrepper | 47/87 |
| 4,050,188 | A | | 9/1977 | van Wingerden | |
| 4,197,674 | A | * | 4/1980 | Blackmore, Jr. | 47/73 |
| 4,586,288 | A | * | 5/1986 | Walton | 47/73 |
| 4,970,824 | A | * | 11/1990 | Visser | 47/86 |
| 6,405,481 | B1 | * | 6/2002 | Bautner | 47/77 |
| RE37,821 | E | * | 8/2002 | VanWingerden | 47/73 |
| 6,546,670 | B2 | * | 4/2003 | Bautner | 47/77 |
| 2003/0217509 | A1 | | 11/2003 | Dümmen | |
| 2008/0115413 | A1 | * | 5/2008 | Blackmore | 47/65.7 |

FOREIGN PATENT DOCUMENTS

DE 102 11 723 C 1 7/2003
FR 2 580 457 * 4/1985

* cited by examiner

*Primary Examiner* — Kristen C Hayes
(74) *Attorney, Agent, or Firm* — Knobbe Martens Olson & Bear, LLP

(57) ABSTRACT

An assembly in use forming a tray for plant material includes a holder; and at least one insert which can be respectively placed in and removed from the holder. The insert includes at least one cell defining a plant position. The cell includes at least a wall and a bottom for accommodating content in the cell during use of the assembly. The at least one wall substantially encloses the plant position. The wall and/or bottom comprises an opening through which access is provided with means for removing the content of the cell, such as a pusher or a ram.

16 Claims, 5 Drawing Sheets

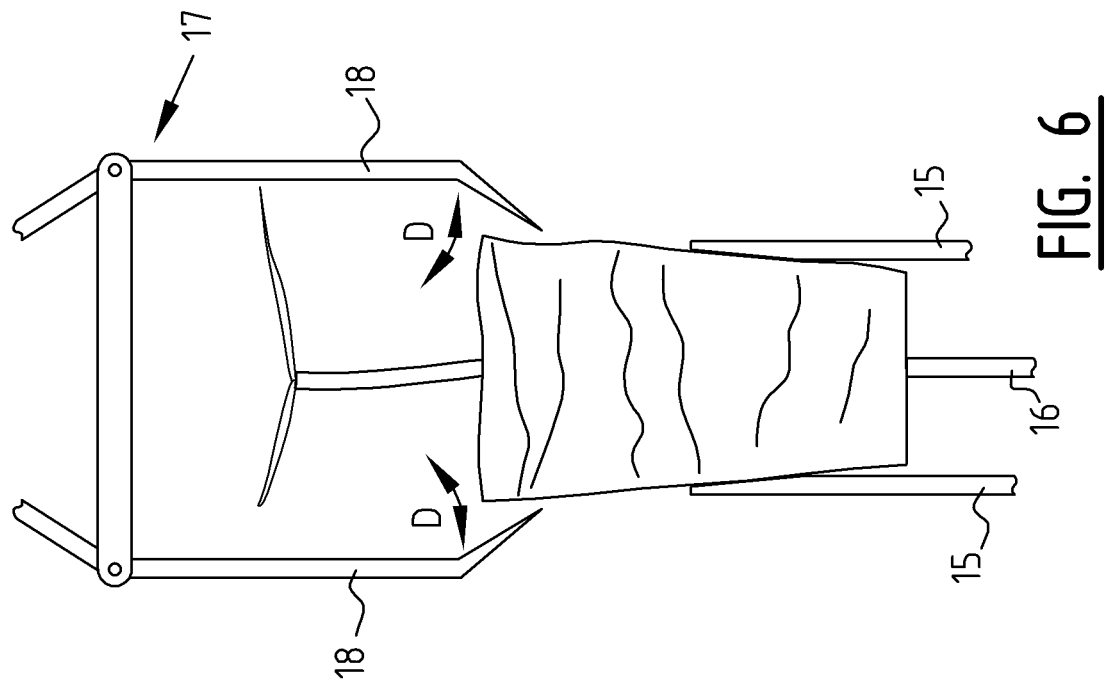
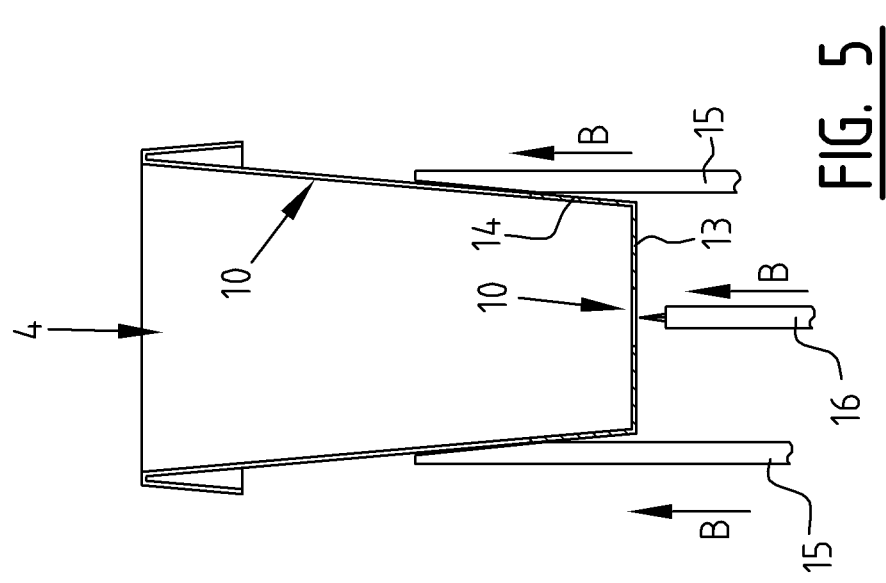

TRAY FOR PLANTS

The present invention relates to a tray for plants.

Trays for plants are generally known in the relevant art. Such trays are for instance manufactured with an injection moulding process or by the deep-drawing, or otherwise consist of one part. Normally defined in such a tray are cells which usually take the form of recesses or cavities relative to the upper surface of such a tray, wherein each cell defines a plant position.

Substrate, in which plant material is positioned, can be arranged in such cavities. Alternatively—e.g. in case of plants having air roots—only plant material such as plant roots may be arranged in the cavities of the cells defining plant positions. Such plant material is for instance a cutting, a seedling, a plant and so on.

Such known trays have drawbacks. It is thus difficult to distinguish the separate cells when a leaf of plant material in one cell extends over the substrate and/or the plant material in a neighbouring cell. This is particularly problematic when the plant material must be transplanted from the tray into another holder, such as a flower pot, or into open ground etc. This is a particular problem when an automated process or automated installation is desirable for automated processing of the plant material in such a tray. The individual cells can be distinguished only with difficulty or not at all, and if the substrate and/or the plant material in a specific cell must be engaged with piercing or gripping means, damage can be caused to the leaf material of neighbouring plant material, even assuming it is possible to orient the gripping or piercing means in sufficiently accurate manner to the cell with the selected plant material therein for the purpose of transplanting thereof.

From DE-102.11.723 and U.S. Pat. No. 4,050,188 assemblies are known, comprising of a holder and an insert, and in accordance with the preambles of the independent claims. Therein each of the inserts comprises a plurality of cells each defining a plant position, with in each instance a dividing wall between cells, wherein at least one side surface of each cell is completely open. The property of at least completely open side surface is necessary according to the prior art, since for extracting a portion of substrate with plant material or only plant material from the plant position, the insert is first removed from the holder, after which the contents in the cell may be removed therefrom, in particular by nudging the contents out of each cell of the insert in a sideways direction, i.e. through the completely open side surface of the cell. However, as a consequence it is a disadvantage of the prior art assemblies, that contents of the cell of the insert may inadvertently fallout of the cell through the entirely open side surface of the cell, which is required to remain open for removing the contents therethrough, as is prescribed in connection with—for example FIG. 5A of U.S. Pat. No. 4,050,188. In particular during handling of an assembly to take the insert out of the holder, such inadvertent falling out of contents of cells may occur, especially when the insert is sufficiently agile to allow for bending thereof.

According to DE-102.11.723, features are provided to enable sideways shifting of inserts out of channels for accommodating in the use the inserts, thus minimizing the need for bending and the risk of the contents falling out of the cells during removal of the inserts from the holder, but this has for a drawback that special provision are needed to close these channels to keep moisture therein, when the inserts are in the holder and are in use to grow plant material. Moreover, this prior art disclosure does not provide any remedy for the problem of the content of the cells inadvertently falling out of the cells during processing subsequent to removal of the insert(s) from the holder. Consequently, according to each above mentioned disclosure, the removal of the contents of the cells is necessarily manual labor, cumbersome and inapt for automatic processing.

The present invention has for its object to obviate, or at least alleviate, the above stated problems of the known art. An assembly having a tray and at least one insert according to the present invention is distinguished for this purpose in that the at least one insert exhibits all of the relevant features of the assembly and insert related independent claims. The invention also relates to apparatuses for removing contents from cells in inserts according to the invention. The assembly and insert are such that the at least one insert can be respectively placed in and removed from the holder. The walls and bottom ensure that the contents of the cell remain contained in the cell, even during this assembling and disassembling of the insert relative to the holder. An apparatus may thus also be oriented at the openings in the wall(s) or bottom for controlled removal of the contents of the cell, more in particular through the plant position or top of the cell, in contrast with the prior art, where removal was effected in a sideways direction. Thus the risk of content falling out of cells inadvertently is diminished, or even inmost if not all cases completely overcome.

The insert may comprise at least two cells, each defining a plant position, in at least one row. Subsequent automated removal of contents from cells in such a row forming insert sequentially is thus enabled or at least improved.

The sequence of cells in such an insert defines a longitudinal direction of the insert. When the insert is taken out of the holder, at least the plant material growing from a transversally neighbouring cell relative to the longitudinal direction of the insert cannot form an obstacle during removal of the substrate and/or the plant material from a desired or selected cell. A neighbouring cell, or at least the plant material therein, in the longitudinal direction of the row may still present an obstacle, but a considerable improvement is nevertheless still realized in the ability to pierce or engage the substrate and/or the plant material in a selected cell. The reason for this is that the substrate and/or the plant material in a selected cell can here be approached from various directions, in particular from a opposite side relative to where plant material grows from the desired or selected cell, without causing any damage to the neighbouring plant material in the longitudinal direction of the row of cells, and without any obstacle being encountered during orienting of gripping and/or piercing means toward the selected cell. Simultaneously the cell is enclosed by the at least one wall, such that content cannot inadvertently drop out of the cell.

The present invention thus entails, that it is thus possible for at least one of the cells of the insert to comprise an opening in the at least one wall or bottom on at least one side of the cell opposite to where plant material is or will grow from the cell. Such an opening makes it possible for gripping and/or piercing means to be oriented to the substrate having therein the plant material as present in a specific cell. Obstruction by leaves or other protruding parts of neighbouring plant material is thus effectively prevented in the case piercing or gripping means are being oriented from a direction opposite to the growing direction of plant material growing from the cell and toward a selected cell, precisely because such orientation of piercing and/or gripping means can take place from a lateral direction below the foliage or other protruding parts. Such an open side can be oriented on the end surface in the longitudinal direction of a row of cells, although an opening in the at least one wall or in the bottom of a cell is preferably arranged in an orientation lying transversely of a longitudinal direction defined by the succession of the at least two cells. This is particularly favourable in embodiments with three or more cells in each series from which the insert is formed.

In an embodiment of an assembly with at least one opening in a wall or bottom of any of the cells the tray can have the advantageous feature that the holder comprises at least one ridge which, in the assembled position of the holder and the insert, abuts against the wall containing the opening of the cell for closing thereof in assembly of the holder and the insert. It is thus possible to prevent moisture or substrate flowing out of or leaving the cell, which could impede the desired progress in the development of the plant material. After the insert has been removed, the opening in a wall or the bottom on the relevant side of the cell is left clear and exposed to allow piercing and/or gripping means to act along or through the wall on the substrate and/or the plant material for the purpose of removal thereof from the cells, while keeping the contents inside the cell as a beneficial effect of the remainder of the wall or bottom next to the opening. A considerable improvement is thus realized in automated processing of such trays. It is noted that the holder need not per se comprise such a ridge, when mutually connecting cells in separate rows or separate inserts comprise a closure for the purpose of closing the opening in a wall in a cell in a neighbouring row. It is likewise possible to envisage a closure being provided as separate component for closing for instance the openings in walls of a number of cells in a row or insert, so that inserts with cells of different dimensions can be placed in the holder, and the holder can thus be made more versatile in use. This latter advantage is however also achieved when such a closure for openings in walls of cells in a neighbouring insert is formed in or on a neighbouring insert in the holder during use.

In yet another preferred embodiments the assembly can comprise aligning means which act on at least one of the holder and the at least one insert for a desired alignment of the insert when the assembly is being assembled. Positioning of the inserts in the holder can thus be considerably facilitated without differences in positioning and with a certain closure of the open walls of the cells. In addition, it can be recommended that the assembly further comprises positioning means which act on at least one of the holder and the at least one insert for a desired positioning of the insert during assembling of the assembly. Alignment and positioning are seen as separate means, although a single feature or element can also be utilized for this purpose in which both functions are implemented in unitary and integral manner.

In a preferred embodiment the assembly according to the invention is such that the insert comprises at least one row of at least two cells. The longitudinal direction of the row already referred to above is hereby defined. It can also be recommended here that the insert comprises a maximum of two mutually connected rows of cells. An insert can thus forma stronger whole. In order to prevent the drawbacks of the known art then reoccurring and coming into play, it can be recommended that the cells in neighbouring rows in a single insert comprise the openings in the walls thereof on mutually opposite sides. It thus remains possible to approach the substrate and/or the plant material in the cell from the relevant wall with the opening with piercing or gripping means, this below the upper surface of the substrate so as to enable removal of the substrate and/or the plant material from the cell without interference from leaves or other obstructive material, and without the content of the cell falling out of the cell as would occur with a completely open wall side, as in the prior art.

Further it is noted here that the invention also covers an insert on its own, as well as an apparatus having either or both of a pusher for abutting against the contents or a ram, more in particular a pin like ram for piercing the contents of the cell.

Following the foregoing general indication of the specific properties of a tray according to the present invention, a specific embodiment will be described hereinbelow on the basis of the accompanying drawings, which are in no way intended or should be interpreted as a limitation of the scope of protection defined in the claims, and in which the same reference numerals are applied for the same or similar parts, components and aspects, and in which:

FIG. 5 shows schematically some of the components of an apparatus for removing contents from cells 4.

FIG. 6 shows schematically when the contents from the cells 4 are lifted above the cell.

Figure 1:
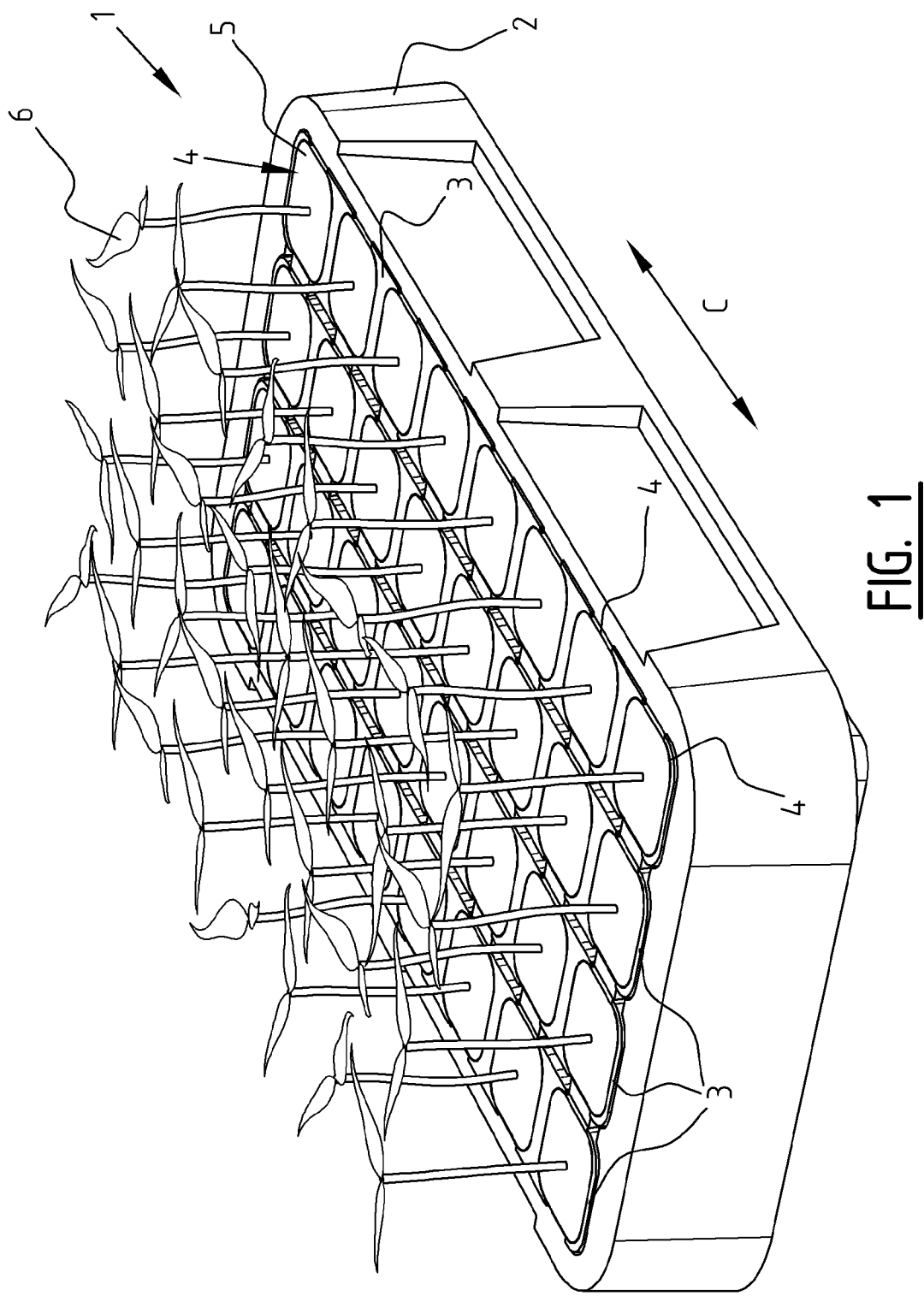
FIG. 1 is a perspective view of a tray in assembled state and in use with plant material therein.

FIG. 1 is a perspective view of a an assembly forming a tray 1 in assembled state according to the present invention which comprises a holder 2 in the form of a type of container in combination with inserts 3 defining plant positions and thereby cells 4. Cells 4 are filled with substrate 5 and plant material 6 grows from the cells in a direction away therefrom in the substrate 5.

In FIG. 1 a single insert 3 comprises a singlular series of cells 4, i.e. eight cells 4 in the example shown here, in longitudinal direction of holder 2. In the example shown in FIG. 1 four inserts 3, each with eight cells 4, are disposed adjacently of each other.

It is noted that each row of cells 4 extending in the lengthwise direction of arrow C of holder 2 in the embodiment of FIG. 1 can already have been formed from a number of separate inserts (maximum of eight).

Figure 2:
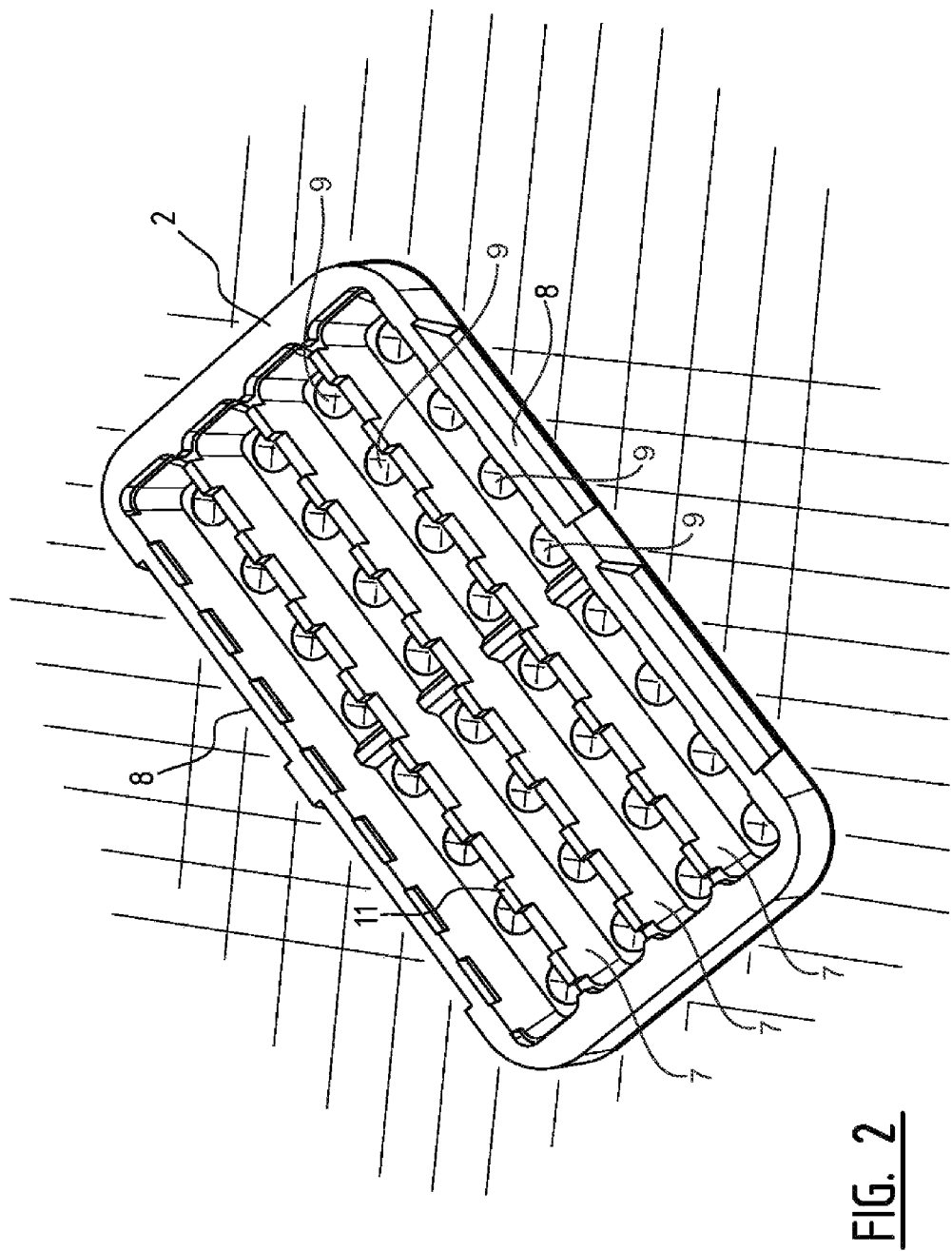
FIG. 2 is a perspective top view of a holder for a tray according to the present invention.

In FIG. 2 the holder 2 of tray 1 of FIG. 1 is shown separately. Holder 2 comprises three ridges 7 which serve to receive inserts 3 between each other and between a ridge 7 and a longitudinal outer wall 8. In this capacity the ridges 7, together with outer walls 8 of holder 2, function as positioning means and as aligning means for the purpose of placing the inserts, to be further described below, into holder 2. It will also be shown herein below that ridges 7 and/or outer walls 8 of holder 2 serve to close openings in side walls (as well as in the bottom) of the individual cells in a series of such cells 4 forming an insert 3. It is further noted that passages 9 which can be selectively opened are arranged in the bottom of holder 2. These can serve for placing of piercing means through the passages 9 for selective opening for the purpose of removing or pushing inserts 3 out of holder 2. Passages 9 for selective opening also provide access to the substrate in a cell 4, and an insert can optionally remain in place when substrate 5 is taken with a plant material 6 out of a cell.

Figure 3:
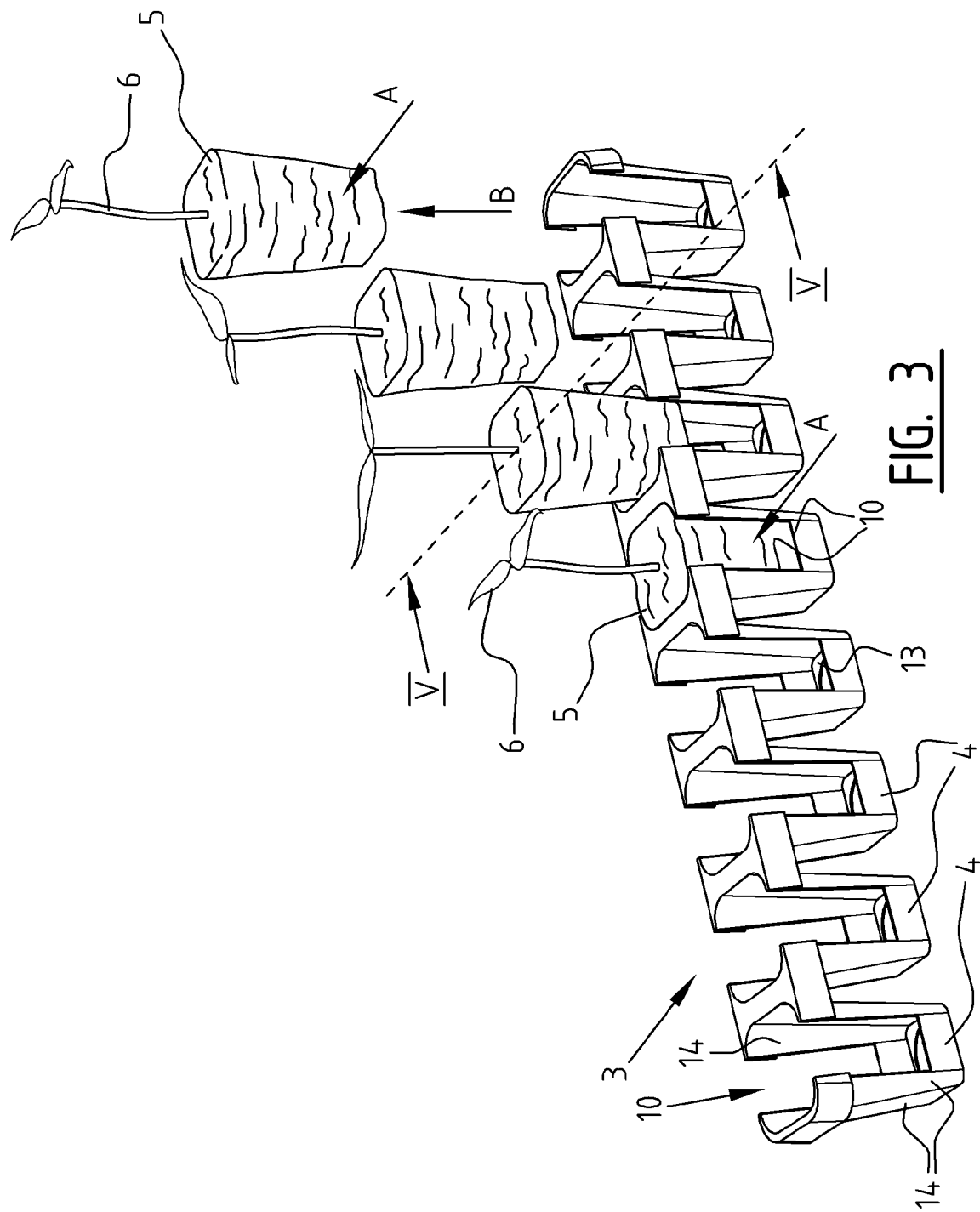
FIG. 3 is a perspective view of an insert according to the present invention for a tray.

FIG. 3 shows an insert 3 consisting of a connected series of cells 4. One of the cells 4 is shown to be filled with substrate 5 in which plant material 6 is growing.

Each cell 4 comprises a bottom 13 and side walls 14, of which at least one side wall 14 comprises an opening 10 and, in the embodiment shown here in FIG. 3, even two openings 10 in opposite side walls 14. Openings 10 in the side walls 14 of cells 4 are oriented transversely of the lengthwise direction of the series of cells 4 together forming insert 3, just as an opening in the bottom 13. The top side of the cells 4 is open to allow for growth of plant material. Side walls 14 containing openings 10 have side wall portions remaining next to the openings. Not the entire side wall 14 is omitted at a side of the cells, as is the case in the prior art. Thus the walls 14 substantially enclose the cells 4, to restrain the contents (substrate and/or roots) of the cells from inadvertently falling out of the cells sideways, after an insert is removed from the holder. Consequently, removal of the contents of the cells there from is not in said sideways direction but in the direction of arrow B in FIG. 3, whilst the openings 10 in the side walls 14 or in the bottom 13 allow removing means, gripping means or piercing means (such as a ram or a pusher) access to these contents of the cells from a direction opposite the growth of plant material, or in any case without hindrance from foliage or the like extending from the open top side of the cells.

The cells 4 at the ends of the series forming insert 3 could also comprise an open side wall on the end surfaces, although this is not shown here in this embodiment.

With insert 3 in a position removed from holder 2 as shown in FIG. 3, access can be gained with a pusher to the substrate 5 in each of the cells 4 in the direction of arrow A, without any obstruction being caused by leaf material of plant material 6 extending over cells. Likewise, access can be gained with a ram or pin to the substrate 5 in each of the cells 4 in the direction of arrow B, i.e. for instance through an opening in the bottom 13 of the cells.

Owing to the downward converging form of each of the cells 4 the piercing or gripping direction as according to arrow A could also be oriented straight upward. Whatever the design of the piercing and/or gripping means, such as a pusher or ram, once a substrate 5 in a cell 4 has been gripped the substrate 5 can be carried upward with plant material 6 in the direction of arrow B in FIG. 3 in order to make substrate 5 with plant material 6 available for transplant or other further processing.

Figure 4B:
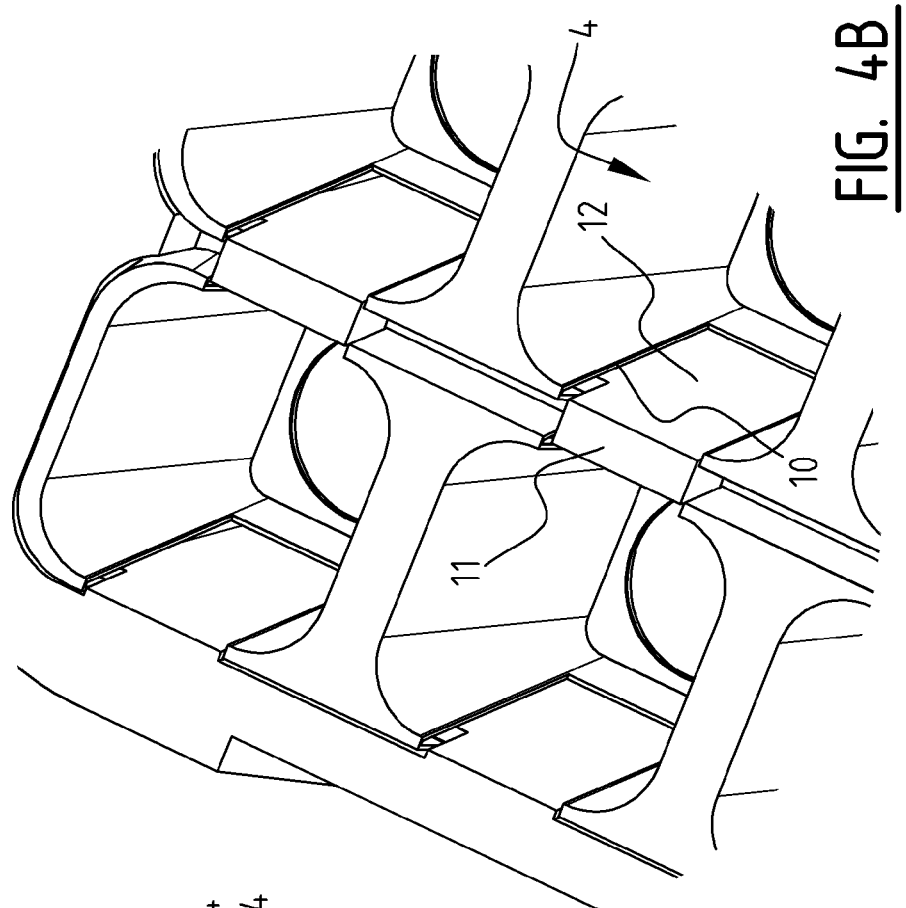
FIG. 4B is a detail view of the embodiment shown in FIG. 4A.
Figure 4A:
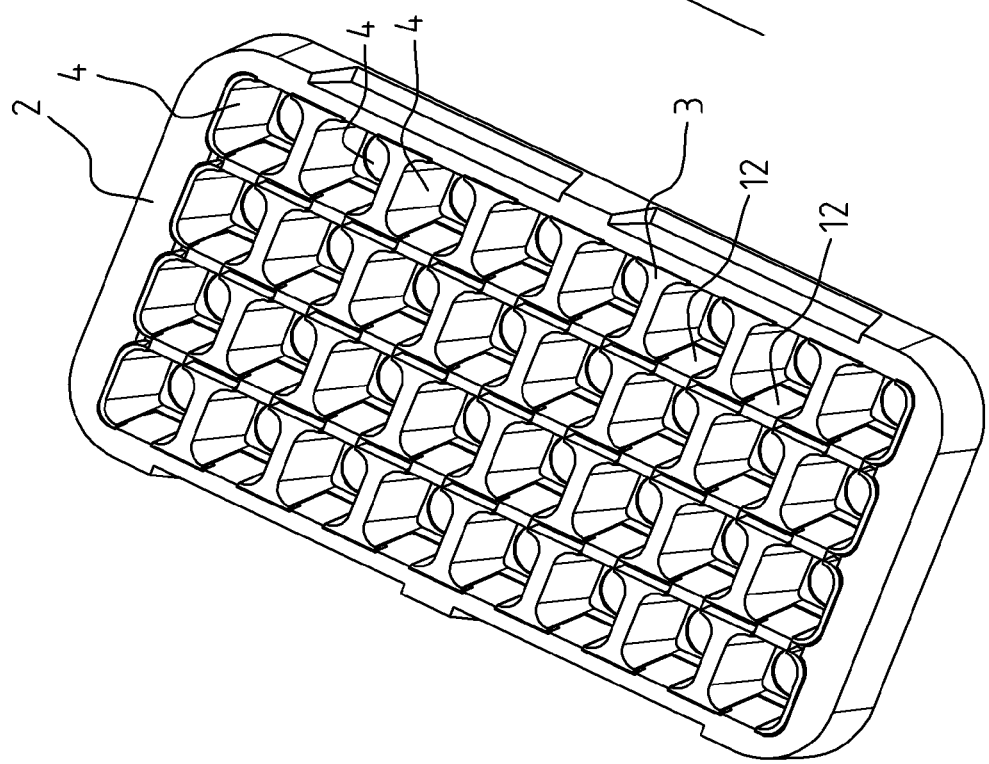
FIG. 4A is a perspective top view of a tray with holder and inserts in assembled state without substrate or plant material.

FIG. 4A shows a view of the embodiment of FIG. 1, but without substrate 5 and plant material 6. Inserts 3, as shown in FIG. 3 with a number of cells 4 in a series or row per insert, are arranged adjacently of each other in holder 2. Ridges 7 here have an upward converging form (corresponding with the outer shape of the cells) and a protrusion 11 in each case between neighbouring inserts 3 and neighbouring cells in the individual series or rows per insert 3. Ridges 7 with protrusions 11 thus form aligning means and positioning means, but also closures for closing the openings 10 in the side walls 14 of cells 4. This is shown in more detail in FIG. 4B. Ridge sections 12 here form closures for closing the open walls 10 of cells 4, as well as aligning means for directing the inserting movement when an insert 3 is moved into the holder 2, as well as positioning means acting on the inserts 3 when arranged in the holder 2.

It is noted that in an embodiment (not shown) protrusions 11 need not always be provided between neighbouring cells 4. It is likewise possible that, in order to bring about closure of the openings 10 and/or positioning and/or alignment of the inserts 3, protrusions 11 can be provided only at locations corresponding in each case with transitions between two inserts 3 at a time, and so no further additional protrusions 11 are provided within the length of one insert 3 and protrusions are placed only at the outer ends of inserts 3.

FIG. 5 shows schematically some of the components of an apparatus for removing contents from cells 4. With an insert 3 removed from holder 2, the openings 10 in side walls 14 and bottom 10 are exposed and allow access to the contents for gripping, piercing or engaging means for removing the contents (not shown in FIG. 5) from any one selected or desired cell 4 of the insert 3. In the embodiment schematically shown here, the apparatus for removing the contents from at least one cell at a time comprises both a pusher forming engaging means and comprising two upright posts 15, and a ram in the form of a pin 16 forming piercing means, although any actual such apparatus may comprise only the pusher 15, 15 or the pin shaped ram 16.

During removal of the contents from a cell, the cell 4 is preferably restrained from upward movement. Then the pusher 15, 15 and/or the pin shaped ram 16 is moved upward in the direction of arrows B. The contents are thereby engaged by the pusher 15, 15 through the opening 10 in side wall 14, and/or pierced by the pin shaped ram 16 through the opening 10 in the bottom 13 of the cell. Thereafter the upward movement of the pusher and/or ram continues to lift the contents in the cell from the cell.

When the contents from the cells 4 are lifted above the cell sufficiently, a gripper 17 is in or is moved into position to take over the contents from the pusher 15, 15 and/or ram 16. The gripper 17 comprises arms 18, which can be driven to open or close in the direction of arrows D. Thus the gripper 17 can take over the contents (substrate with plant material) from the pusher 15, 15 and/or ram 16 for further transport, handling or processing.

It will thus be immediately apparent that, after examination of the foregoing, many alternative and additional embodiments will occur to the skilled person, all of which lie within the scope of protection of the present invention according to the appended claims, unless such additional or alternative embodiments depart from the letter or spirit of that defined in these claims.

It is thus possible to mutually connect two inserts as shown in FIG. 3 and to provide only the outer sides of a thus assembled insert with an opening in any of the side walls 14. Access can then still be provided to substrate 5 with plant material 6 therein from the outer sides in the direction of the arrow A shown in FIG. 3. As addition to that shown in FIG. 3, an insert can also comprise closures along a side, preferably on a side where no open walls are provided. The closures can thus be utilized to close openings 10 in side walls 14 of neighbouring or adjacent inserts, so that ridges 7 clearly need not necessarily be applied for this purpose in the holder. All that is important is that, if the mutual correlation of inserts 3 in holder 2 is broken by removal of a specific insert 3 from holder 2, an opening in the bottom or any of the side walls is left clear for providing access thereto for piercing and/or gripping means.

Another embodiment, which is not described or shown, can be one wherein a ridge 7 separate of holder 2 can be utilized, which can then be placed or inserted as separate additional component into clamps or similar means in or on holder 2. More freedom can thus be provided in respect of the dimensions of the inserts, the choice of which can then be variable. The individual cells of an insert are shown as converging downward in the figures. It is equally possible to make use, with open side walls 10, of cells having the same dimensions in downward direction, although an injection moulding process is then perhaps less suitable for the purpose of manufacturing such inserts. Such an embodiment does however have the specific advantage that closed side walls of an insert can also form closures for open walls of cells in an adjacent insert without great modifications to the shape. The cells can have in top view a square form, a round form, an oval form or any random form other than that given in the figures and the associated description. The series of cells in each insert 3 can also be oriented transversely of the longitudinal direction of a holder, where in FIG. 1 and FIG. 4A the series or inserts 3 extend in the lengthwise direction of holder 2. For the purpose of mechanical processing, recesses can further be arranged in the upper edge of holder 2 in order to provide access to an end surface or the like of an insert 3 with the series of cells 4 therein. This has the advantage that mechanical removal of inserts 3 from holder 2 can be realized. Inserts 3 preferably have a design wherein inserts 3 can be positioned successively in a direction of forward movement. In such a direction of forward movement the last of the cells can have the same distance relative to the last but one of the cells and relative to the first cell of a following insert 3. This is also referred to as an endless design, wherein the intermediate distance between each pair of cells is always constant, even if there is a transition therebetween from a one insert to a subsequent insert. This also contributes toward improving mechanical processing, wherein inserts 3 are placed successively on a conveyor belt or the like to enable the processing as according to FIG. 3 to be performed in the direction of forward movement.

What is claimed is:

1. An assembly for holding plant material, comprising:
    a holder; and
    at least one insert which can be respectively placed in the holder for achieving an assembled state and can be removed therefrom for achieving a disassembled state, wherein the insert comprises at least one cell defining a plant position, said cell comprising at least one wall, at least one side wall, and a bottom to be filled during use with at least one content selected from the group consisting of plant material and a growth substrate,
    wherein:
        the holder and the insert are not identical to each other; and,
        the at least one side wall comprises a remainder segment that contacts the bottom, and an opening extending to a top of the cell sized and positioned to enable access to the plant position, in the disassembled state, through each opening, wherein the remainder segment is adjacent to the opening, said remainder segment is between the opening and the bottom and is configured to maintain the at least one content in the plant position in a disassembled state of the assembly.

2. The assembly of claim 1, wherein the insert comprises at least one row of at least two cells.

3. The assembly of claim 2, wherein the cells together define a longitudinal direction and the opening in the at least one side wall of each cell is oriented transversely of the longitudinal direction.

4. The assembly of claim 2, wherein the insert comprises a maximum of two mutually connected rows of cells.

5. The assembly of claim 1, wherein the holder comprises at least one ridge.

6. The assembly of claim 1, having at least two separate inserts, wherein at least one of the inserts comprises a ridge.

7. The assembly of claim 1, wherein the holder further comprises aligning means configured to act on the at least one insert to provide a desired alignment of the insert.

8. The assembly of claim 1, wherein the holder further comprises positioning means configured to act on the at least one insert to provide a desired positioning of the insert.

9. The assembly of claim 1, wherein the substantially enclosing wall of the insert diverges in a direction away from the bottom.

10. The assembly of claim 1, further comprising one or more walls including ridges and protrusions for aligning the insert during assembling of the assembly.

11. The assembly of claim 1, further comprising ridges and protrusions configured for positioning the insert during assembling of the assembly.

12. A kit comprising an apparatus; and an assembly:
    said assembly comprising:
        a holder; and
        at least one insert which can be respectively placed in the holder for achieving an assembled state and can be removed therefrom for achieving a disassembled state, wherein the insert comprises at least one cell defining a plant position,
        wherein said at least one cell comprises at least one wall, at least one side wall, and a bottom to be filled with at least one content selected from the group consisting of plant material and a growth substrate,
            wherein the bottom comprises a cell bottom opening, and
            wherein the at least one side wall comprises a remainder segment that contacts the bottom, and an opening to enable, in the disassembled state, access therethrough to the plant position for controlled extraction of the content in the cell wherein the remainder segment is adjacent to the opening,
    said apparatus comprising:
        at least one pusher, wherein the at least one pusher is configured to contact contents of the cell through the opening in the at least one side wall; and
        a pin, wherein the pin is configured to contact the contents of the cell through the cell bottom opening and the pin is configured to be able to be inserted into the contents of the cell to maintain the contents of the cell in an upright position during removal of the contents of the cell.

13. The kit of claim 12, further comprising a gripper, said gripper capable of receiving from the at least one pusher and the pin the contents of the cell after removal thereof from out of the cell by the pusher and the pin.

14. A method of assembling the assembly according to claim 1, comprising:
    providing the holder;
    placing the at least one insert in the holder so as to provide the at least one cell defining a plant position;
    filling the at least one cell with the at least one content selected from the group consisting of plant material and a growth substrate;
    removing the insert from the holder so as to achieve a disassembled state;
    maintaining the at least one content in the plant position in the cell wherein said remainder segment is configured to maintain the at least one content in the plant position in the disassembled state;
    accessing the plant position through the at least one side wall opening; and
    controllably extracting the at least one content from the cell.

15. The method of claim 14, wherein the placing comprises aligning at least one of the holder and the at least one insert for a desired alignment of the insert.

16. The method of claim 14, wherein the placing comprises positioning the holder and the at least one insert for a desired positioning of the insert.

* * * * *